United States Patent
Arnold et al.

(10) Patent No.: US 8,500,601 B2
(45) Date of Patent: Aug. 6, 2013

(54) METHOD FOR THE OPERATION OF A TRANSMISSION DEVICE OF A VEHICLE DRIVE TRAIN

(75) Inventors: Jorg Arnold, Immenstaad (DE); Klaus Steinhauser, Kressbronn (DE); Valentine Herbeth, Friedrichshafen (DE); Christian Popp, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 240 days.

(21) Appl. No.: 13/140,033

(22) PCT Filed: Jan. 13, 2010

(86) PCT No.: PCT/EP2010/050342
§ 371 (c)(1),
(2), (4) Date: Jun. 16, 2011

(87) PCT Pub. No.: WO2010/081820
PCT Pub. Date: Jul. 22, 2010

(65) Prior Publication Data
US 2011/0284335 A1      Nov. 24, 2011

(30) Foreign Application Priority Data
Jan. 15, 2009   (DE) .......................... 10 2009 000 254

(51) Int. Cl.
*F16H 61/00*       (2006.01)
*F16H 3/44*        (2006.01)
(52) U.S. Cl.
USPC .......................................... 477/154; 475/303
(58) Field of Classification Search
USPC .................. 477/116, 143, 154; 475/302, 303, 475/208, 209; 74/336 R, 340
See application file for complete search history.

(56) References Cited

U.S. PATENT DOCUMENTS

| | | | |
|---|---|---|---|
| 3,834,499 A * | 9/1974 | Candellero et al. ............. 477/73 |
| 6,301,984 B1 | 10/2001 | Petzold |
| 2002/0005077 A1 * | 1/2002 | Ozaki et al. ................. 74/336 R |
| 2002/0073792 A1 * | 6/2002 | Okada et al. ................ 74/336 R |
| 2004/0118652 A1 | 6/2004 | Muetzel et al. |
| 2005/0037891 A1 * | 2/2005 | Shishido et al. ............. 477/109 |
| 2008/0228431 A1 | 9/2008 | Guggolz et al. |
| 2009/0264241 A1 * | 10/2009 | Dittrich et al. ................ 475/209 |
| 2009/0272211 A1 * | 11/2009 | Hoffmann et al. ............. 74/325 |
| 2010/0044183 A1 | 2/2010 | Guggolz et al. |

FOREIGN PATENT DOCUMENTS

| | | |
|---|---|---|
| DE | 197 56 637 A1 | 6/1999 |
| DE | 199 29 819 C1 | 11/2000 |
| DE | 102 43 278 A1 | 3/2004 |
| DE | 10 2005 032 225 B3 | 8/2006 |
| EP | 1 826 441 A1 | 8/2007 |
| WO | 2007/137680 A1 | 12/2007 |

* cited by examiner

Primary Examiner — Roger Pang
(74) Attorney, Agent, or Firm — Davis & Bujold, PLLC

(57) ABSTRACT

A method of operating a transmission of a vehicle drive train with at least one drive machine. The transmission is formed with at least one interlocking shift element and a plurality of frictional shift elements in order to obtain various gear ratios. During an engaging process of the interlocking shift element, starting from a disengaged operating condition, in which halves of the interlocking shift element are out of engagement, to an engaged operating condition, in which the shift element halves are interlocked in a rotationally fixed manner, when interlock between the shift element halves is obstructed, a rotational speed difference is produced at least temporarily between the shift element halves, at which the interlock in the area of the interlocking shift element can be engaged. To produce the speed difference between the shift element halves, the transmission capacity of at least one frictional shift element is increased.

13 Claims, 3 Drawing Sheets

| | A | B | C | D | E | F |
|---|---|---|---|---|---|---|
| "1" | × | | | × | | × |
| "2" | × | | × | | | × |
| "3" | × | × | | | | × |
| "4" | | | | | × | × |
| "5" | × | × | | | × | |
| "6" | × | | × | | × | |
| "7" | × | | | × | × | |
| "8" | | | × | × | × | |
| "9" | | × | | × | × | |

METHOD FOR THE OPERATION OF A TRANSMISSION DEVICE OF A VEHICLE DRIVE TRAIN

This application is a National Stage completion of PCT/EP2010/050342 filed Jan. 13, 2010, which claims priority from German patent application serial no. 10 2009 000 254.5 filed Jan. 15, 2009.

FIELD OF THE INVENTION

The invention concerns a method for operating a transmission device of a vehicle drive train.

BACKGROUND OF THE INVENTION

In automatic transmissions known from practice which, besides frictional shift elements, also comprise interlocking shift elements for obtaining various gear ratios, in unfavorable operating conditions the possibility exists that during a change in the operating condition of the automatic transmission or during a gearshift an interlocking shift element cannot be changed to the desired extent from an open operating condition, during which the shift element halves of the interlocking shift element are out of engagement, to a closed operating condition in which the shift element halves are connected rotationally fixed with one another in an interlocked manner.

This, for example, is the case in the event of an intermediate operating condition of an interlocking shift element, in which the halves of the shift element are in contact with one another without a rotationally fixed connection in a so-termed tooth-on-tooth position and are rotating at the same speed, so that between the shift element halves of the interlocking shift element there is too small a rotational speed difference for the desired interlock in the area of the interlocking shift element. During such an intermediate operating condition of an interlocking shift element, in the area of the interlocking shift element there is a frictional connection between its shift element halves, which is suddenly broken only when a certain load point is exceeded, so the interlock is produced in the area of the shift element, undesirably, at a moment which can only be determined in advance with difficulty.

Furthermore, in the present context operating conditions of interlocking shift elements are also classified as intermediate operating conditions, during which there is too high a speed difference between the shift element halves of an interlocking shift element, which opposes the formation of an interlock. Depending on the design of the drive train, this is the case particularly after operation of a vehicle first begins.

From DE 197 56 637 A1 a shifting device is known for connecting components of a transmission rotating at different speeds to at least one shifting group, such that the shifting device is actuated by a control fluid. During operation of the transmission device a current operating condition of the shifting group containing at least one interlocking shift element is monitored, and if a tooth-on-tooth position of the teeth to be interlocked occurs, a synchronizing force in the area of the interlocking shift element is minimized, in order to produce a drag torque during the synchronization of the interlocking shift element to be closed, by virtue of which the tooth-on-tooth position should be eliminated.

The proposed procedure for eliminating a tooth-on-tooth position in the area of an interlocking shift element presupposes an exact knowledge of the current operating condition of the interlocking shift element, which can only be determined with considerable difficulty, in order to minimize the synchronizing force to the extent required for resolving the tooth-on-tooth position.

SUMMARY OF THE INVENTION

Accordingly, the purpose of the present invention is to provide a method for operating a transmission device of a vehicle drive train, by means of which an intermediate operating condition of a shift element, or tooth-on-tooth position of an interlocking shift element, can be eliminated in a simple and inexpensive manner without exact knowledge of the current operating condition of the interlocking shift element.

In the method according to the invention for operating a transmission device of a vehicle drive train with at least one drive machine, such that to obtain various gear ratios the transmission device comprises at least one interlocking shift element and a plurality of frictional shift elements and during a closing process of the interlocking shift element starting from an open operating condition, in which the shift element halves of the interlocking shift element are out of engagement, to a closed operating condition in which the shift element halves are connected to one another with interlock in a rotationally fixed manner, in the event of an intermediate operating condition of the interlocking shift element during which interlock between the shift element halves is prevented, at least for a time a rotational speed difference is produced between the shift element halves such that the interlock in the area of the interlocking shift element can be engaged.

According to the invention, to produce a speed difference between the shift element halves of the interlocking shift element, the transmission capacity of at least one frictional shift element is increased.

In this way the intermediate operating condition of an interlocking shift element, which for example corresponds to a tooth-on-tooth position of the interlocking shift element, can be resolved without exact knowledge of the current operating condition of the interlocking shift element, in a purely functional, simple and inexpensive manner by increasing the transmission capacity of at least one frictional shift element already present in the transmission device.

In addition, by means of the procedure according to the invention an interlocking shift element can be changed out of intermediate or undefined operating conditions, which can occur for example in a transmission device after the first operation of a drive machine of the vehicle drive train begins and during which there is between the shift element halves of an interlocking shift element too high a rotation speed difference to enable the interlock to be formed, into an operating condition necessary for a closing process of the interlocking shift element. This means that the speed difference between the shift element halves of the interlocking shift element can be adjusted to a value necessary for enabling the production of the interlock in the area of the interlocking shift element, by increasing the transmission capacity of the frictional shift element.

With the procedure proposed according to the invention, in contrast to the procedure known from the prior art there is no need for exact knowledge of the operating point of an interlocking shift element in the event of an intermediate operating condition, since during the method according to the invention the operating condition of the interlocking shift element is not changed directly by varying the actuation of the interlocking shift element, but instead by increasing the transmission capacity of at least one frictional shift element of the transmission device. This increase of the transmission capacity of the frictional shift element brings about in the area of the interlocking shift element a rotational speed difference between the shift element halves of the interlocking shift element, such that the interlocking shift element can be closed.

In an advantageous variant of the method according to the invention, to produce the speed difference the transmission capacity of the frictional shift element is increased while at least one further shift element is closed, such that by virtue of the frictional shift element and the further frictional shift element in the closed condition a gear ratio of the transmission device can be obtained.

In a further advantageous variant of the method, to obtain the gear ratio that can be engaged in the transmission device by means of the frictional shift element and the further shift element, the interlocking shift element is disengaged from the force flow of the transmission device.

In a variant of the method according to the invention characterized by little need for control and regulation effort, the intermediate operating condition of the interlocking shift element can be determined as a function of the actuating force of the interlocking shift element or an operating magnitude of the transmission device equivalent thereto, the operating magnitude preferably being an actuating pressure of the interlocking shift element.

In addition or alternatively to this, in a further advantageous variant of the method according to the invention the intermediate operating condition of the interlocking shift element can be determined by a path detection device and/or a contact recognition device associated with the interlocking shift element, the contact recognition device preferably being operated electrically or electromagnetically.

BRIEF DESCRIPTION OF THE DRAWINGS

Further advantages and advantageous further developments of the invention emerge from the claims and from the example embodiment whose principle is described with reference to the drawing, which shows:

DETAILED DESCRIPTION OF THE PREFERRED EMBODIMENTS

Figures 1, 2:
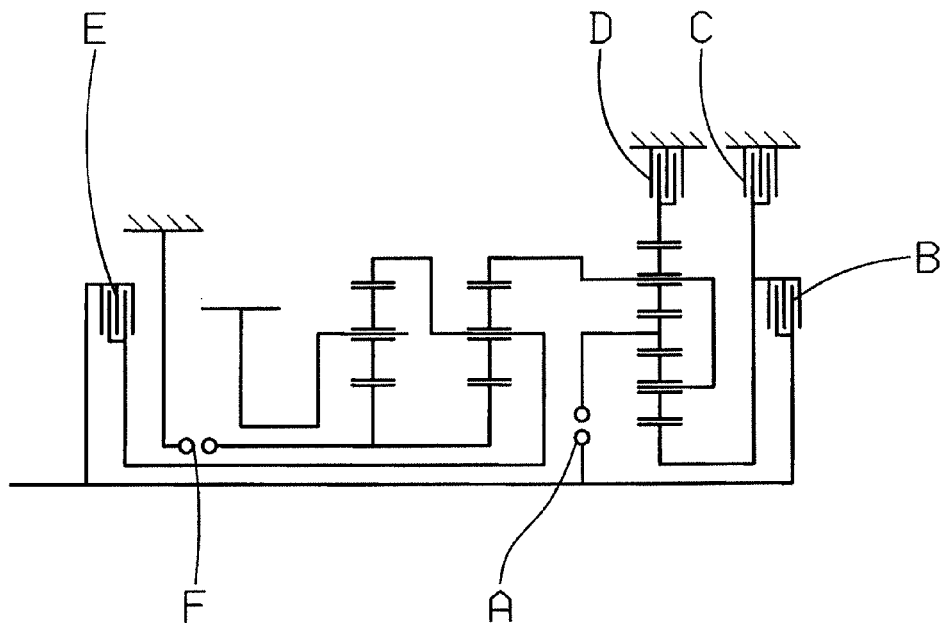
FIG. 1: Gear layout of a transmission device.
FIG. 2: Shifting scheme of the transmission device of FIG. 1.

FIG. 1 shows a gear layout of a transmission device 1 having two interlocking shift elements A and F and four frictional shift elements B, C, D and E. By means of the shift elements A to F various shafts of the transmission device 1, in this case designed as a planetary transmission, can be connected to one another in the manner required in each case in order to obtain various gear ratios "1" to "9".

To obtain the gear ratios "1" to "9" in each case a plurality of the shift elements A to F have to be engaged in the force flow of the transmission device 1, the shift elements A to F which are engaged in the force flow in each case being indicated in FIG. 2 with an X, while the other shift elements are in each case in the open operating condition. For example, to obtain the first gear "1" the shift elements A, D and F have to be engaged in the force flow of the transmission device 1, while at the same time the shift elements B, C and E are in the fully open operating condition. In general, except for the fourth gear "4", which is obtained by engagement of only two shift elements E and F in the force flow of the transmission device 1, in all other cases three of the shift elements A to F have to be changed or engaged in the force flow of the transmission device 1 in order to engage one of the gears "1" to "3" or "5" to "9" in the transmission device 1.

Figure 3:
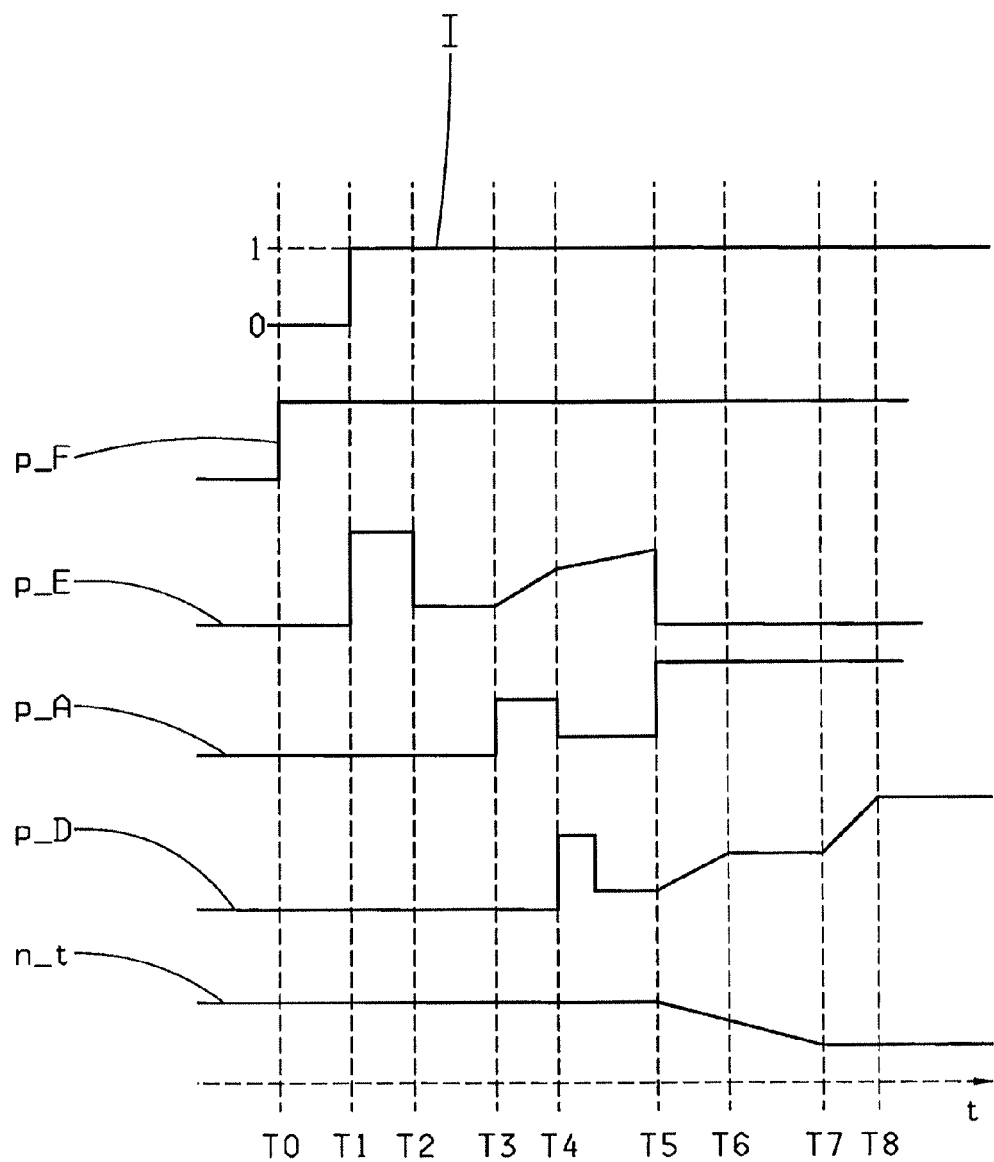
FIG. 3: A number of variations of various operating condition parameters of the transmission device in FIG. 1, during an operating condition change of the transmission device starting from a neutral operating condition into a gear for forward driving.

FIG. 3 shows a number of variations with time t, of various operating condition parameters of the transmission device of FIG. 1, during an operating condition change of the transmission device 1 starting from a neutral operating condition, in which the shift element F is fully closed and the other shift elements A to E are essentially fully open, toward an operating condition in which the first gear "1" is engaged in the transmission device 1.

At a time T0, first an actuating pressure p_F of the shift element F is increased and the shift element F is closed. At another time T1 an electric transmission control unit (not shown) of the transmission device 1 issues a shift command for a shift of the transmission device 1 from the neutral operating condition to the first gear "1". This has the result that a variation I increases abruptly from the value 0 to the value 1. At the same time, in the manner shown in more detail in FIG. 3 a piston space of the shift element E of the transmission device 1 is pre-filled from time T1 during a rapid-filling pulse of the actuating pressure p_E, which ends at a time T2, and during a subsequent filling adjustment phase which ends at a time T3, an actuating piston of the fluidically actuated shift element E is brought into contact with a disk packet of the frictional shift element E in this case made as a disk clutch.

At time T3 an actuating pressure p_A of the interlocking shift element A, which also has to be engaged in the force flow of the transmission device 1 to obtain the first gear "1", is increased. At the same time, from time T3 the actuating pressure p_E of the shift element E is increased along a pressure ramp so that the transmission capacity of the shift element E increases. Between time T3 and a time T4 an intermediate operating condition of the interlocking shift element A is determined, during which the shift element halves of the interlocking shift element rest against one another without a rotationally fixed connection and at least approximately connected by friction, and are rotating at least nearly with the same speed, i.e. they are in a so-termed tooth-on-tooth relationship which prevents complete closing of the interlocking shift element A.

During a shift under load which involves a frictional shift element and an interlocking shift element, if the interlock in the area of the interlocking shift element cannot be produced despite the exertion of a force produced for example by an electric control element, a hydraulic or pneumatic force application means or the like on the interlocking shift element, because of a tooth-on-tooth position or because of too large a speed difference between the shift element halves, this can be detected for example by a pressure increase in the feed line or in a piston space of the interlocking shift element. In such a case the possibility exists, for example when the interlocking shift element is actuated by a hydraulic actuating pressure, of determining the pressure peak that occurs by means of a pressure measuring device arranged in the feed line or piston space of the interlocking shift element in the event that interlock has not taken place, and relating it to the existing gear ratio deviation.

In addition or alternatively, an actuation of an interlocking shift element and the non-occurrence of interlock in the area of the interlocking shift element can be verified by means of a path-measuring device that comprises a displacement sensor.

Also alternatively or in addition to the above, it is possible to determine the actuation of an interlocking shift element and the non-occurrence of interlock in the area thereof by means of an electric or electromagnetic measuring device, and this can be done for example by suitable contact recognition means.

To be able to release the tooth-on-tooth position in the area of the interlocking shift element A with low reaction torques in the transmission device 1, the actuating pressure p_A of the shift element A is reduced, in this case at time T4. At the same time the transmission capacity of the frictional shift element E is increased further from time T4 along a pressure ramp flatter compared with the pressure ramp provided between times T3 and T4, until a time T5. The result is that in the transmission device 1 the fourth gear "4" is increasingly engaged and in the area of the shift element halves of the interlocking shift element A, a speed difference is produced, which resolves the tooth-on-tooth position in the area of the interlocking shift element A.

At time T5 the shift element A has the speed difference needed for closing, and is closed by increasing its actuating pressure p_A. Again at the same time, the actuating pressure p_E of the frictional shift element E is reduced abruptly essentially to zero at time T5 and the transmission capacity of the shift element E consequently also falls essentially to zero, so that no torque can any longer be transmitted by the shift element E.

To be able to carry out the required shift starting from the neutral operating condition toward the first gear "1" within a predefined shifting time, the shift element D which, to obtain the first gear "1", also has to be engaged in the force flow of the transmission device 1 and in the present case is made as a friction brake, is acted upon with fluid in the manner shown in detail in FIG. 3, with an actuating pressure p_D in a rapid-filling pulse and a subsequent filling adjustment phase, so that by time T5 it is prepared to be engaged. From time T5 the actuating pressure p_D of the shift element D is increased along a first pressure ramp ending at a time T6, and kept at that pressure level until a time T7.

The result of increasing the actuating pressure p_D of the shift element D between times T5 and T6 and of its constant pressurization until time T7 is that a transmission input speed n_t is changed between times T5 and T7 from the synchronous speed or engine idling speed of the drive machine of the vehicle's drive train, to the level of the synchronous speed of the first gear "1".

At time T7, when the transmission input speed n_t has reached the synchronous speed of the first gear "1", the actuating pressure p_D is increased along a second pressure ramp that lasts until a time T8 up to the closing pressure of the shift element D, whereby the required shift or operating condition change of the transmission device is completed.

Figure 4:
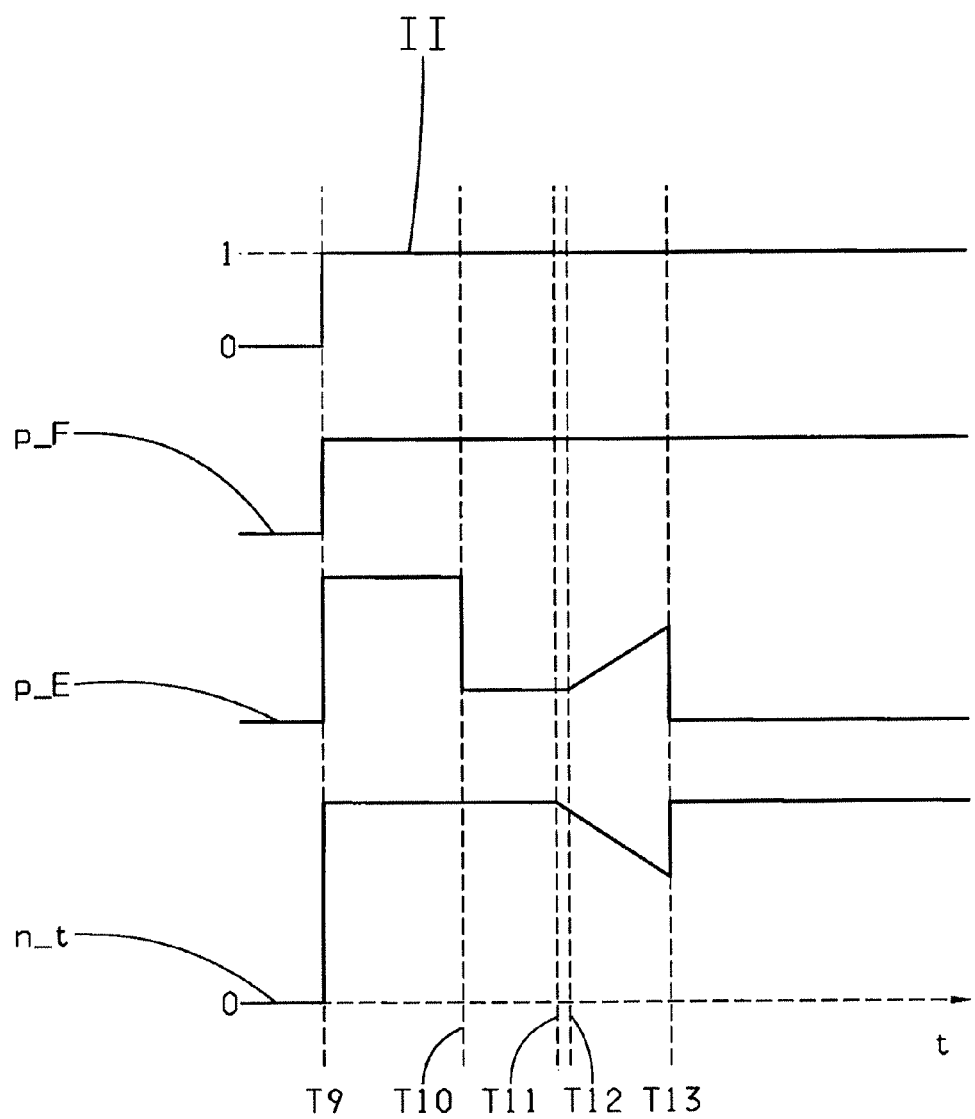
FIG. 4: A number of variations of various operating condition parameters of the transmission device of FIG. 1 and of a vehicle drive train with the transmission device.

FIG. 4 shows a number of variations of various operating parameters of a vehicle drive train constructed with the transmission device 1 during a variation of the vehicle drive trains operating condition in which a switched-off drive machine of the vehicle's drive train is started. Before the starting time T0 of the drive machine the shift elements A to F of the transmission device 1 are all in their fully open operating condition. This results from the fact that when the drive machine is switched off, a hydraulic pump that supplies the shift elements A to F with actuating pressure does not produce any fluid pressure when the drive machine is switched off, and the design of shift elements A to F is such that unless appropriately pressurized, they move to a fully open operating condition.

At time T9 the drive machine is started and as a result a variation II jumps abruptly at time T9 from 0 to the value 1. When the drive machine has started, the actuating pressure p_F of the shift element F also designed as an interlocking shift element rises. Again at the same time, the shift element E arranged relative to the interlocking shift element F on the transmission input side is prepared for at least partial engagement by a rapid-filling pulse between time T9 and a time T10, and during a subsequent filling adjustment phase that lasts until a time T11. In this case, between times T9 and a time T11 earlier than the time T12 the transmission input speed n_t corresponds to the idling speed of the drive machine.

After the motor has started the interlocking shift element F is in an undefined operating condition or sometimes in an intermediate operating condition with a speed difference at which the shift element F cannot be closed. During this, in unfavorable operating conditions of the transmission device 1 it is possible that the shift element halves of the interlocking shift element F are in a tooth-on-tooth position with no rotationally fixed connection, at least approximately in frictional contact with one another and rotating at the same speed, so that the shift element F cannot be closed with interlock in the desired, rotationally fixed manner.

Furthermore, however, after the drive machine has started it is possible for the interlocking shift element to be in an intermediate operating condition in which, between the shift element halves, there is a speed difference too large for the shift element F to be engaged.

Yet, during both of the above operating conditions of the shift element F a certain amount of torque can be transmitted by it, due to which the transmission input speed at time T12, at which torque can also be transmitted by the frictional shift element E, decreases starting from the idling speed of the drive machine of the vehicle's drive train toward the synchronous speed of the fourth gear when the actuating pressure p_E of the frictional shift element E is increased from time T11 along a pressure ramp until a time T13 in the manner shown. By means of a speed sensor it is determined that the transmission input speed n_t at time T13 is lower than a predefined speed value and that a speed change has taken place which can only occur when the shift element F is fully closed and at the same time the transmission capacity of the frictional shift element E is appropriate.

In this way, at time T13 it is recognized that the tooth-on-tooth position in the area of the interlocking shift element F has been successfully eliminated by increasing the transmission capacity of the shift element E. As soon as the speed change is recognized, the friction clutch or frictional shift element E is opened again by abruptly reducing its actuating pressure p_E.

In the last-described procedure, after a motor start no direct attempt is made to close the interlocking clutch or interlocking shift element F starting from an undefined operating condition thereof. The interlocking shift element F is changed to a defined operating condition by increasing the transmission capacity of the frictional shift element E and then closed, so that intermediate operating conditions such as tooth-on-tooth positions in the area of an interlocking shift element can be eliminated simply and inexpensively.

Basically, by means of the method according to the invention operating conditions of a transmission device of a vehicle drive train are recognized, during which an interlock in the area of an interlocking shift element required in order to transmit a torque cannot be produced because of a tooth-on-tooth position or even because of a speed difference between the shift element halves of an interlocking shift element that is too large. In addition, by virtue of the method according to the invention a transmission device is actuated in a manner that such intermediate operating conditions are resolved functionally, so that a shift operation commanded in the transmission device can also be discontinued in the event of unfavorable operating condition variations during which an intermediate operating condition of an interlocking shift element cannot be eliminated.

INDEXES

"1" to "9" Gear ratio
A to F Shift element
1 Transmission device
I, II Variation
n_t Transmission input speed
p Actuating pressure
t Time
T0 to T13 Points in time

The invention claimed is:

1. A method of operating a transmission device (1) of a vehicle drive train with at least one drive machine such that the transmission device (1) is formed with at least one interlocking shift element (A, F) and with a plurality of frictional shift elements (B, C, D, E) in order to obtain various gear ratios and during an engaging process of the at least one interlocking shift element (A, F), starting from a disengaged operating condition, in which shift element halves of the at least one interlocking shift element (A, F) are out of engagement, to the engaged operating condition in which the shift element halves of the at least one interlocking shift element (A, F) are engaged with one another in a rotationally fixed manner, and in an event of an intermediate operating condition of the at least one interlocking shift element (A, F) in which interlock between the shift element halves is prevented, a rotational speed difference is produced at least temporarily between the shift element halves, at which the interlock, in an area of the at least one interlocking shift element (A, F), is engagable, and to produce the rotational speed difference between the shift element halves of the at least one interlocking shift element (A, F), a transmission capacity of at least a first frictional shift element (E) is increased, the method comprising the steps of:

reducing the transmission capacity of the first frictional shift element (E) to approximately zero after the at least one interlocking shift element (A, F) is engaged such that torque is no longer transmitted by the first frictional shift element (E); and engaging a further shift element (F) in a force flow of the transmission device (1) once the transmission capacity of the first frictional shift element has been reduced.

2. The method according to claim 1, further comprising the step of increasing the transmission capacity of the first frictional shift element (E) when the at least one further shift element (F) is engaged to produce the speed difference, so that by virtue of the frictional shift element (E) and the further shift element (F) in the engaged condition, a gear ratio ("4") of the transmission device (1) is obtained.

3. The method according to claim 2, further comprising the step of disengaging the at least one interlocking shift element (A) from the force flow of the transmission device (1) to obtain the gear ratio ("4") that is engaged in the transmission device by first the frictional shift element (E) and the further shift element (F).

4. The method according to claim 1, further comprising the step of fluidically actuating the shift elements (A to F) and pre-filling the first frictional shift element (E) during a rapid-filling pulse with the further shift element (F) engaged.

5. The method according to claim 4, further comprising the step of increasing the capacity of the first frictional shift element (E) after an end of a filling adjustment phase that follows the rapid-filling pulse.

6. The method according to claim 5, further comprising the step of increasing, either during or after the filling adjustment phase of the first frictional shift element (E), an actuating force of the at least one interlocking shift element (A) which changes the at least one interlocking shift element (A) at least approximately from the disengaged operating condition to the engaged operating condition.

7. The method according to claim 6, further comprising the step of reducing the actuating force of the at least one interlocking shift element (A) when the intermediate operating condition is recognized, and increasing the transmission capacity of the first frictional shift element (E) to produce the speed difference between the shift element halves.

8. The method according to claim 6, further comprising the step of increasing the actuating force of the at least one interlocking shift element (A) and changing the at least one interlocking shift element (A) to the engaged operating condition when a speed difference between the shift element halves of the at least one interlocking shift element (A) exists, and reducing the transmission capacity of the first frictional shift element (E) to at least approximately to zero when the at least one interlocking shift element (A) is engaged.

9. The method according to claim 1, further comprising the step of determining the intermediate operating condition of the at least one interlocking shift element (A, F) as a function of a rotational speed signal (n_t) of a shaft of the transmission device (1).

10. The method according to claim 1, further comprising the step of determining the intermediate operating condition of the at least one interlocking shift element (A, F) as a function of either the actuating force of the at least one interlocking shift element (A, F) or an operating magnitude of the transmission device equivalent thereto.

11. The method according to claim 10, further comprising the step of defining the operating magnitude as an actuating pressure of the at least one interlocking shift element (A, F).

12. The method according to claim 1, further comprising the step of determining the intermediate operating condition of the at least one interlocking shift element (A, F) by a path detection device associated with the at least one interlocking shift element (A, F).

13. The method according to claim 1, further comprising the step of determining the intermediate operating condition of the at least one interlocking shift element (A, F) by virtue of a contact recognition device associated with the interlocking shift element.

* * * * *